United States Patent
Mannen et al.

(10) Patent No.: US 7,024,522 B2
(45) Date of Patent: Apr. 4, 2006

(54) WORM GUARANTEE STORAGE DEVICE EMPLOYING BLOCK WRITE INHIBITION INFORMATION

(75) Inventors: Akihiro Mannen, Yokohama (JP); Naoto Matsunami, Hayama-machi (JP); Akira Nishimoto, Sagamihara (JP); Yusuke Nonaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/912,636

(22) Filed: Aug. 4, 2004

(65) Prior Publication Data
US 2005/0262300 A1 Nov. 24, 2005

(30) Foreign Application Priority Data
May 24, 2004 (JP) ............................. 2004-153516

(51) Int. Cl.
*G06F 12/14* (2006.01)
(52) U.S. Cl. ..................... 711/152; 711/114; 711/163
(58) Field of Classification Search ........ 711/111–114, 711/152, 163; 360/60
See application file for complete search history.

(56) References Cited

U.S. PATENT DOCUMENTS

| | | | |
|---|---|---|---|
| 5,088,081 A | | 2/1992 | Farr |
| 6,265,853 B1 * | | 7/2001 | Takagi et al. ............... 323/220 |
| 6,285,583 B1 * | | 9/2001 | Cleveland et al. ..... 365/185.04 |
| 6,317,281 B1 * | | 11/2001 | Ogawa et al. ................ 360/60 |
| 6,330,648 B1 | | 12/2001 | Wambach et al. |
| 6,738,879 B1 * | | 5/2004 | Chan et al. .................. 711/164 |

FOREIGN PATENT DOCUMENTS

| | | |
|---|---|---|
| EP | 0584804 A3 | 3/1994 |
| EP | 1061517 A1 | 12/2000 |
| JP | 07-013705 | 1/1995 |
| JP | 2000-347814 A | 12/2000 |
| JP | 2000-347815 | 12/2000 |
| JP | 20001-202295 | 7/2001 |
| WO | WO93/19413 A2 | 9/1993 |

* cited by examiner

*Primary Examiner*—T Nguyen
(74) *Attorney, Agent, or Firm*—Townsend and Townsend and Crew LLP (57) ABSTRACT

To provide a disk array system which particularly enables the use of a WORM function when the disk array system uses RAID. When receiving a write request from a computer (100), it is judged whether or not a writing of write data from the computer is possible, based on a content indicated by write inhibition information. If the writing is possible, the guarantee code of the transferred data is generated, the write inhibition information indicating that a region in which the data is stored is not writable is generated, and the generated write inhibition information is stored in the guarantee code, the guarantee code storing the write inhibition information is assigned to the region in which the data received from the computer (100) is stored, and the data to which the guarantee code storing the write inhibition information is assigned is stored in a cache memory (230) and/or a disk drive (270). If the write data from the computer (100) is not writable, it is informed to the computer (100).

9 Claims, 6 Drawing Sheets

WORM GUARANTEE STORAGE DEVICE EMPLOYING BLOCK WRITE INHIBITION INFORMATION

CLAIM OF PRIORITY

The present application claims priority from Japanese application P2004-153516 filed on May 24, 2004, the content of which is hereby incorporated by reference into this application.

BACKGROUND OF THE INVENTION

This invention relates to a disk array system using RAID, and more particularly to a disk array system with a WORM function.

As a data format used when recording data in a storage system, a WORM (Write Once Read Many) format is known in which a writing operation can be performed only once while a reading operation can be performed repeatedly. For example, data stored in CD-R is in a WORM format.

As a type of applying this WORM to a rewritable medium such as a hard disk device, there is a type in which with regard to all sectors on a disk, respective predetermined flag information are recorded in sector ID sections. The flag information includes the information of data write attributes to the sectors. Three kinds of a write permission, a write inhibition, and a write-once permission can be set. Accordingly, a disk device is known in which, when the data write attribute of the sector including the data that is not desired to be erased is set to the write inhibition, an accidental user data destruction due to an operational mistake of a user who operates a host and an intentional user data destruction due to by a computer virus originally made for the sake of a user data destruction can be preliminarily protected, thereby improving the reliability of the disk device with regard to a user data protection (for example, refer to JP 7-13705 A).

On the other hand, in a disk array system, redundant data is prepared and stored in a disk device so as to allow data to be restored even when a fault occurs in the disk device. Moreover, a method of appending a guarantee code for each logical data block is known in order to enhance the reliability of the entire disk array. Examples of the method of appending the guarantee code include, as noted in JP 2001-202295A and JP 2000-347815A, a method in which, when data is written to a disk device, the guarantee code composed of a logical address value LA (Logical Address) and an exclusive-OR LRC (Longitudinal Redundancy Check) is appended to the data on a logical data block basis and the resultant data is written to the disk device, and when the data is read from the disk device, the LA value and LRC value which are appended to each logical data block are checked, thereby checking whether or not an address change or a data change has occurred within the disk device.

SUMMARY OF THE INVENTION

In the technique of JP 7-13705A described above, the WORM can be attained by a single piece of disk device. However, in a RAID system including a plurality of disk devices, certain data is recorded in different regions of the plurality of disk devices. For example, in RAID0 and RAID5, a certain piece of data is written in different formats to the plurality of disk devices simultaneously. Therefore, in order to attain the WORM in this system, extremely complex processes as at a hardware level, such as a process for setting the different regions of the different disk devices as being write-inhibited, are required, thereby making it difficult to apply this technique to the disk array system having many disk devices.

According to this invention, when receiving a data write request from a computer, a control unit: refers to write inhibition information indicating whether or not a writing to a region of a disk device specified by the write request is possible, from a cache memory; and judges whether or not the writing of write data from the computer is possible, based on a content indicated by the write inhibition information. If the write data from the computer can be written to the region, the control unit receives the data transferred from the computer; generates a guarantee code of the data transferred from the computer; generates the write inhibition information indicating that the region in which the data transferred from the computer is not writable; stores the generated write inhibition information in the guarantee code, and assigns the guarantee code storing the write inhibition information, to the region in which the data received by a host input/output I/F from the computer is stored; and stores the data to which the guarantee code storing the write inhibition information is assigned, in the cache memory and/or the disk device. If the write data from the computer can not be written to the region, the control unit informs its fact to the computer.

It is therefore an object of this invention to provide a storage system in which a WORM function can be used even when the storage system uses RAID.

According to this invention, a guarantee code is assigned to each of plural pieces of data received from a computer, and a write inhibition bit is assigned to each of the plural pieces of data. Thus, the write inhibition can be set for each unit of data which is stored in a cache memory and/or any of the plurality of disk devices. Consequently, the WORM function can be attained even in the disk array device of the RAID configuration provided with the plurality of disk devices.

DESCRIPTION OF THE PREFERRED EMBODIMENTS

Embodiments of this invention will be described below with reference to the drawings.

Figure 1:
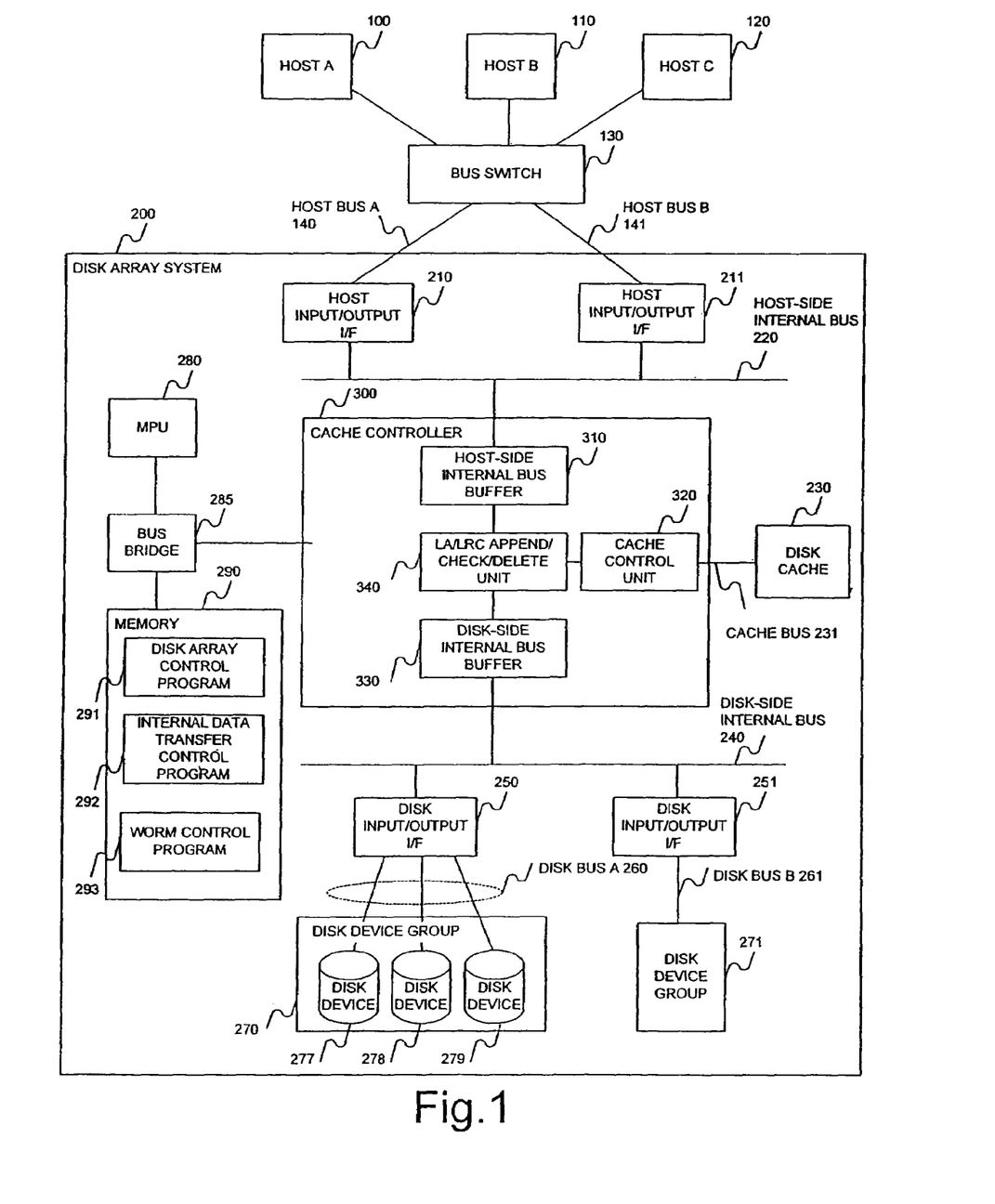
FIG. 1 is a block diagram showing a system configuration of a first embodiment of this invention.

FIG. 1 is a block diagram showing a system configuration of a first embodiment of this invention.

A host computer (hereafter, referred to merely as "host") A 100, a host B 110, and a host C 120 are devices for inputting/outputting data by transferreing a read/write request to a disk array system 200. In the disk array system in this embodiment, one or a plurality of hosts and the disk array system 200 are connected through a bus switch 130.

The disk array system 200 includes host input/output I/Fs 210 and 211, a disk cache 230, disk input/output I/Fs 250 and 251, disk device groups 270 and 271, a control unit (processor, MPU) 280 for controlling the entire disk array, a bus bridge 285, a memory 290, and a cache controller 300. Each of the disk device groups 270 and 271 has plurality of disk devices (for example, disk drives). In this embodiment, as an example, the disk device group 270 has three disk devices 277 to 279, which constitute RAID. Here it is sufficient that there exist at least one or more host input/output I/Fs 210 and 211. It is also sufficient that there exist at least one or more disk input/output I/Fs 250 and 251. It is further sufficient that there exist at least one or more disk device groups 270 and 271.

It should be noted that the host input/output I/F 210, the cache controller 300, the MPU 280, the bus bridge 285, the memory 290, the disk cache 230, and the disk input/output I/F 250 constitute a RAID controller (disk controller).

The host A 100, the host B 110 and the host C 120 are connected through the bus switch 130, a host bus (host communication path) A 140, and a host bus (host communication path) B 141 to the host input/output I/Fs 210, 211 of the disk array system 200. FIG. 1 shows the example in which the three hosts are connected to the disk array system 200, but it is sufficient that at least one or more hosts are connected to the disk array system 200.

The host input/output I/Fs 210, 211 receive input/output requests from the host A 100, the host B 110, and the host C 120, and transfer data between those hosts and the cache controller 300. These host input/output I/Fs 210, 211 are connected through a host-side internal bus (host-side internal communication path) 220 to the cache controller 300.

The disk input/output I/Fs 250, 251 transfer data between the disk device groups 270, 271 and the cache controller 300. These disk input/output I/Fs 250, 251 are connected through a disk bus (disk communication path) A 260 and a disk bus B 261 to the disk device groups 270 and 271, respectively, and connected through a disk-side internal bus (disk-side internal communication path) 240 to the cache controller 300. The disk input/output I/F 251 also has the same configuration and function as those of the disk input/output I/F 250.

The disk cache 230 is connected through a cache bus 231 (cache communication path) 231 to the cache controller 300.

The cache controller 300 includes a host-side internal bus buffer 310, a cache control unit 320, and a disk-side internal bus buffer 330. The host-side internal bus buffer 310 temporarily stores data transferred between the host input/output I/Fs 210, 211 and the disk cache 230. The cache control unit 320 controls reading and writing the data from and to the disk cache 230. The disk-side internal bus buffer 330 temporarily stores data transferred between the disk input/output I/Fs 250 and 251 and the disk cache 230. Also, the cache controller 300 has an LA/LRC append/check/delete unit 340. This LA/LRC append/check/delete unit 340 appends LA and LRC, which will be described later, to data transferred from the host input/output I/Fs 210, 211 to the disk cache 230, and also checks and deletes the LA and LRC which are appended to the data transferred from the disk cache 230 to the host input/output I/Fs 210, 211.

The MPU 280 is connected through the bus bridge 285 to the memory 290 and the cache controller 300.

The memory 290 stores a disk array control program 291, an internal data transfer control program 292, and a WORM control program 293. Those programs are executed by the MPU 280. The MPU 280 controls the process of the entire disk array based on the disk array control program 291. Also, the MPU 280 instructs the cache controller 300 to set the LA/LRC based on the internal data transfer control program 292, and issues a data transfer instruction to the host input/output I/Fs 210, 211 and the disk input/output I/Fs 250, 251. The MPU 280 controls a write inhibition bit in writing the data to the disk device groups 270, 271, as described later, based on the WORM control program 293.

Next, the LA and the LRC will be described below, and the appending, checking, and deleting processes for the LA or LRC to be performed on the transfer data by the LA/LRC append/check/delete unit 340 will be described below.

The disk array system 200 in this embodiment divides the data received from the host computer into logical blocks to manage and process the data. This divided minimum unit is referred to as a logical data block. The size of the logical data block is the minimum read/write unit (namely, a sector size) from and to the disk device.

The LA/LRC append/check/delete unit 340 of the cache controller 300 appends the guarantee code, which is referred to as a 4-byte LA (Logical Address) containing a part of a transfer destination address, to each logical data block, and enables the detection of the reading/writing from and to the abnormal address of the data divided into the logical blocks. The LAs of the continuous logical data blocks are set to have continuous values. The MPU 280 executes the internal data transfer control program 292 stored in the memory 290 to thereby indicate a value to be appended to the LA/LRC append/check/delete unit 340. The LA/LRC append/check/delete unit 340 appends, among the data (logical data block) received from the host which is divided by the host-side internal buffer 310 of the cache controller 300, a value indicated by the MPU 280 as the LA to the first logical data block, and appends to the logical data block following it, the value obtained by adding 1 to the value indicated by the MPU 280, as the LA.

On the other hand, the LRC (Longitudinal Redundancy Check) is a value obtained by exclusive-ORing the 1st byte to 516th byte of the data having a 516-byte length, which is obtained by adding the size 4 bytes of the LA to 512 bytes that is the size of a logical data block, on a 4-byte unit basis. The LA/LRC append/check/delete unit 340 calculates the value of the LRC with regard to each logical data block and the appended LA, and further appends the LRC to the logical data block appended with the LA. The LA/LRC append/check/delete unit 340 checks the value of the LRC to thereby allow detection of a data bit error induced during the data transfer and within the disk device.

It should be noted that the specific method of appending, checking, and deleting the LA/LRC is described in JP 2001-202295A and JP 2000-347815A.

Figure 2:
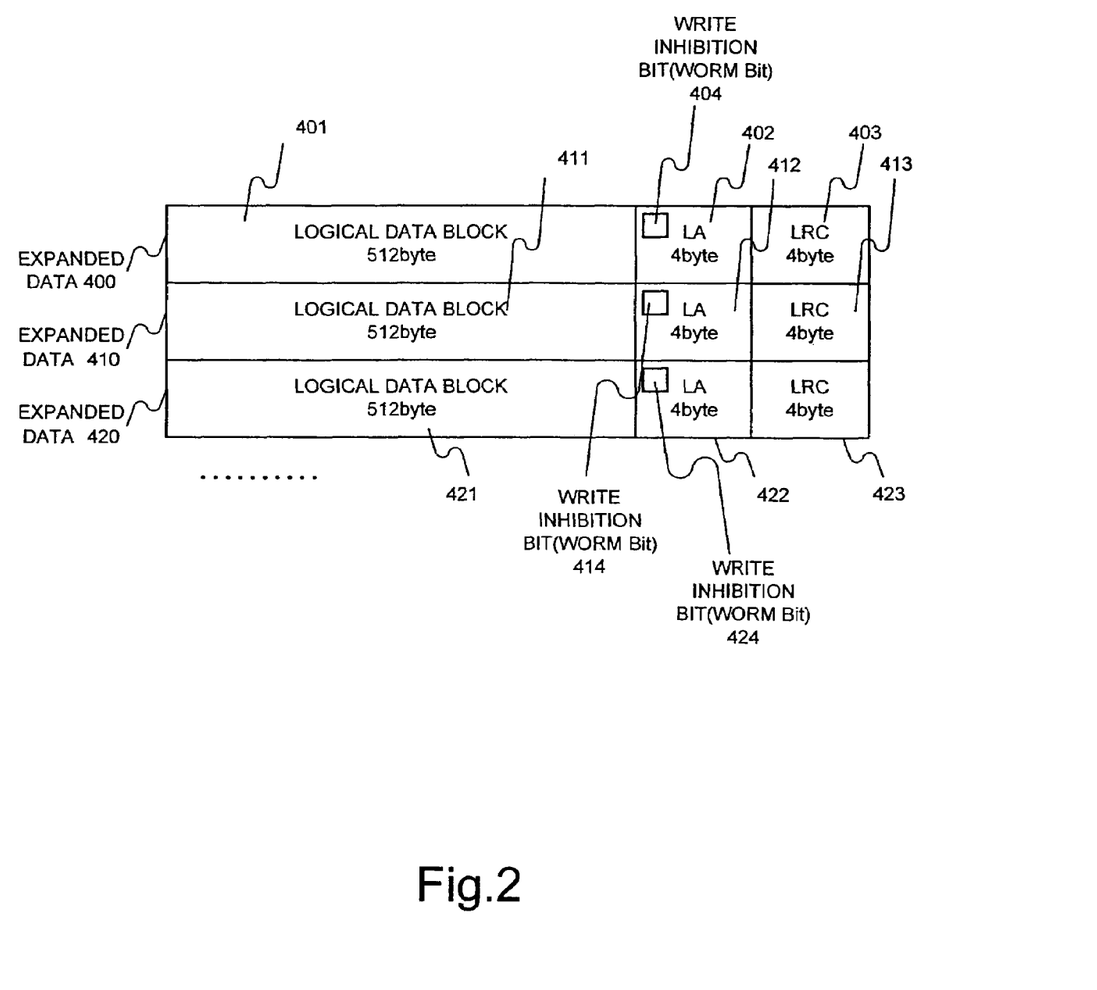
FIG. 2 is an explanatory diagram of LA and LRC which are appended to a logical data block according to the first embodiment of this invention.

FIG. 2 shows a specific example of the LA and LRC appended to the logical data block by the LA/LRC append/check/delete unit 340.

Logical data blocks 401, 411, and 421 are blocks obtained by dividing host data transferred from the host A 100 to the disk array system 200, with the cache controller 300. Those three logical data blocks are originally continuous piece of host data in the order of the logical data block 401, the logical data block 411, and the logical data block 421. An LA 402 is an LA corresponding to the logical data block 401 and has a size of 4 bytes. The LA 402 is appended to the end of the logical data block 401. Moreover, the value obtained by exclusive-ORing 516-byte-length data obtained by adding the LA 402 to the logical data block 401, in a lateral direction (direction from the 1st byte to the 516th byte) on a four-byte unit basis, is appended as an LRC 403 to the end of the LA 402. The LRC 403 is 4 bytes in size. An LA 412 and an LRC 413 are an LA and an LRC corresponding to the logical data block 411, respectively. An LA 422 and an LRC 423 are an LA and an LRC corresponding to the logical data block 421, respectively. Those LAs and LRCs are appended to the respective logical data blocks, similarly to the LA 402 and the LRC 403. The data of 520 bytes consisting of the logical data block 401, the LA 402, and the LRC 403 is an expanded data block 400. Similarly, reference numerals 410 and 420 each denote an expanded data block.

The LA and LRC appending processes are executed by the LA/LRC append/check/delete unit 340, when data is transferred from the host input/output I/F 210 or 211 to the disk cache 230. Also, when data is transferred from the disk cache 230 to the host input/output I/F 210 or 211, the LA/LRC append/check/delete unit 340 examines whether or not there is an error in the expanded data block, by checking the LA and LRC in the expanded data block read from the disk cache 230. When there is no error, the LA/LRC append/check/delete unit 340 deletes the LA and LRC with a total size of 8 bytes, from the expanded data block. Then, the cache controller 300 transfers only the logical data block of 512 bytes to the host input/output I/F 210 or 211. Thus, the data transferred through the host-side internal bus 220 is the logical data block, and the data transferred through the cache bus 231 and the disk-side internal bus 240 are the expanded data block.

The data transferred between the disk cache 230 and the disk input/output I/F 250 or 251 is the expanded data block. When the expanded data block is transferred between the disk cache 230 and the disk input/output I/Fs 250 or 251, the LA/LRC append/check/delete unit 340 carries out only the check of the LA and LRC. When there is no error, the transfer of the expanded data block is continued. When the LA/LRC append/check/delete unit 340 checks the LA and LRC, when detecting the error of the LA or LRC, the LA/LRC append/check/delete unit 340 reports the content of the error to the MPU 280, and the MPU 280 suitably processes the error based on an error processing routine.

Here, in this embodiment, 1 bit unused among the 4 bytes of the LA 402 is defined as a write inhibition bit (WORM bit) 404. This write inhibition bit 404 is information indicating whether or not the writing to the logical data block 401 appended with the LA 402 including the write inhibition bit 404 is inhibited. For example, When the write inhibition bit 404 is set to "1", the writing to the logical data block 401 is inhibited. When the write inhibition bit is set to "0", the writing to the logical data block is possible.

This write inhibition bit 404 is set by the WORM control program 293 under the control of the MPU 280. When the data is transferred from the host input/output I/F 210 or 211 to the disk cache 230, the MPU 280 executes the internal data transfer control program 292 stored in the memory 290 to thereby execute the LA/LRC appending process in the LA/LRC append/check/delete unit 340. At this time, the WORM control program 293 is executed to instruct the LA/LRC append/check/delete unit 340 to set the write inhibition bit 404 for the appended LA. Also, the WORM control program 293, when receiving a write command to the sector from the host, refers to the setting of the write inhibition bit 404 of the logical data block of the sector, and returns a response. When the write inhibition bit 404 is set to "1", namely, "Write Inhibition", the writing to the sector is inhibited. Thus, as the response of the write command, an error is returned to the host. When the write inhibition bit 404 is set to "0", namely, "Writable", the response indicating that the writing to the sector is possible is returned to the host.

It should be noted that the LA 402 is appended to the logical data block 401 and the write inhibition bit 404 is set for the LA 402, followed by the calculation of the LRC 403 to further append the LRC 403.

Next, a WORM function using the write inhibition bit 404 will be described below.

Figure 3:
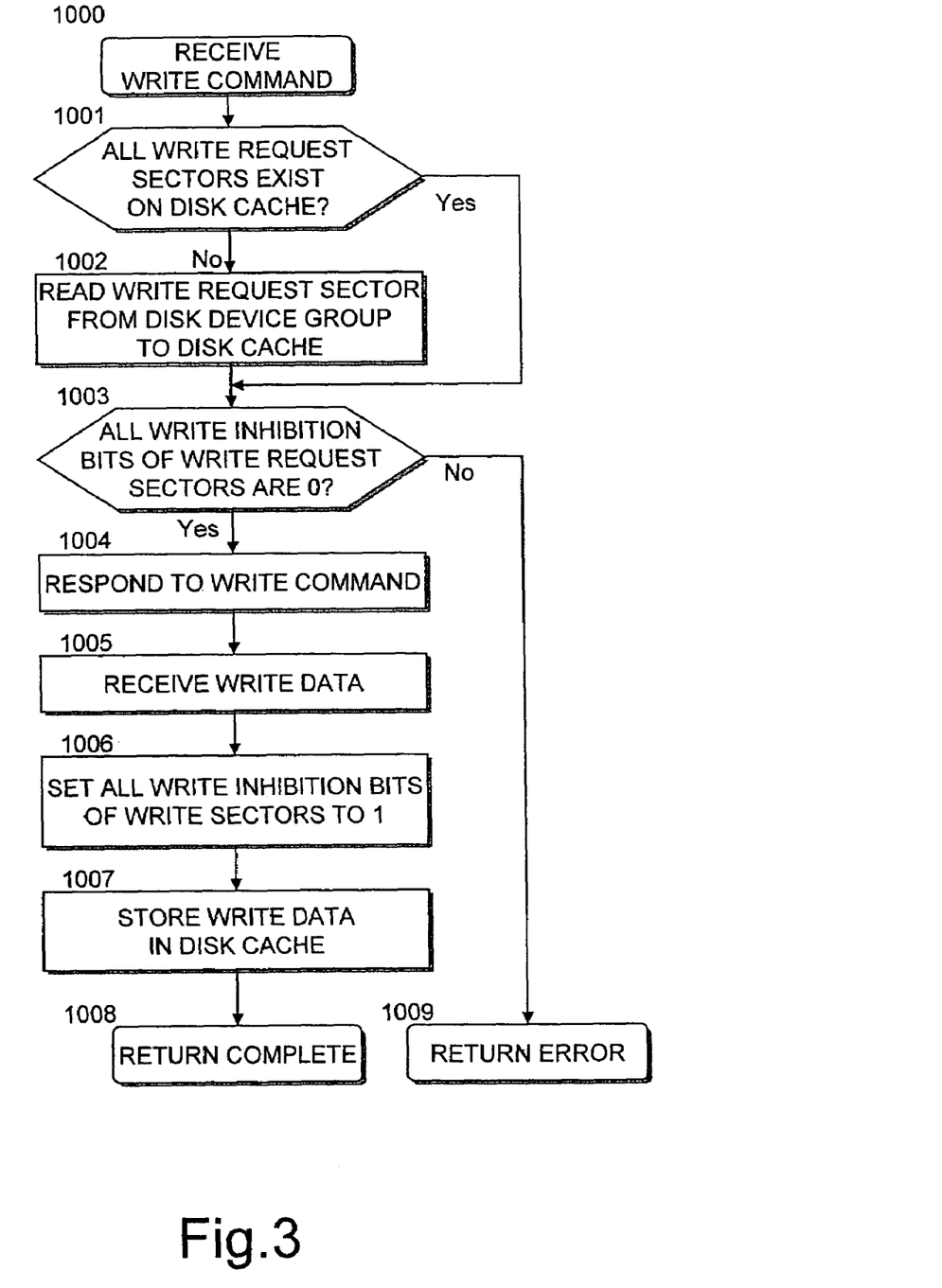
FIG. 3 is a flowchart showing a process for storing a WORM data in a disk cache according to the first embodiment of this invention.

FIG. 3 is a flowchart showing a process for storing WORM data in the disk cache 230, which is executed by the MPU 280.

The MPU 280 of the disk array system 200, when receiving the write command from the host A 100 (Step 1000), judges whether or not the data of the sectors requested by the write command are all stored in the disk cache 230 (Step 1001).

When at least one of the sectors related to the request is judged not to be stored in the disk cache 230, the sectors related to the request is read from the disk device group 270 to the disk cache 230 (Step 1002). At this time, When there is a sector that has already been stored in the disk cache 230, for this sector, the one in the disk cache 230 is used and only the sector that is not in the disk cache 230 is read.

When all the requested sectors are judged to be present in the disk cache 230, the process advances to Step 1003, without reading the data of the sector from the disk. It should be noted that the read sector is stored as the expanded data block of 520 bytes in the disk cache.

Next, it refers to the write inhibition bit 404 included in the LA 402 of the sector. Then, it is judged whether or not the write inhibition bits 404 of all the sectors related to the request are set to "0", namely, whether or not all the sectors are set to "Writable" (Step 1003). When at least one write inhibition bit 404 of the sectors related to the request is judged to be set to "1", namely, at least one sector is judged to be set to the write inhibition, the error is returned to the host A 100 issuing the write command (Step 1009).

When all the write inhibition bits 404 of the requested sectors are judged to be set to "0", namely, all of the requested sectors are judged to be writable, the response to the write command received in Step 1000 (the response of a write command permission, a data transmission request, or the like) is transferred to the host A 100 (Step 1004).

The host A 100, when receiving this response, transferres to the disk array system 200 write data to be written to the requested sector.

The MPU 280, when receiving the write data corresponding to the write command received in Step 1000 (Step 1005), sets all the write inhibition bits 404 of the LA 402 to be appended to the logical data block of the write data, to "1" (Step 1006).

Specifically, the LA/LRC append/check/delete unit 340 appends the LA and LRC to the write data sent through the host input/output I/F 210 or 211 and the host internal bus 220 to the cache controller 300. The WORM control program 293 sends to the LA/LRC append/check/delete unit 340 an instruction of setting the write inhibition bit 404 to "1" or "0". In this flowchart, when the write inhibition bits 404 of the sector to which the data is written in Step 1003 are all at "0", the write inhibition bits of the sector are still at the initial state. Thus, this implies the first writing of the data to the sector. Then, in order to attain the WORM function, namely, in order to inhibit the writing process on and after the second trial, the write inhibition bit 404 of the sector on which the writing process has been performed is set to "1".

After that, even if the write command to the sector is received from the host, the write command is not received, and the error is returned.

The write inhibition bit 404 of the LA 402 is set to "1", and the logical data block (expanded data block 400) appended with the LA 402 and the LRC 403 is stored in the disk cache 230 (Step 1007). When the expanded data block 400 is stored in the disk cache 230, the MPU 280 returns the message indicating the completion of the data writing, to the host A 100 (Step 1008). It should be noted that the expanded data block stored in the disk cache 230 is de-staged at any timing or when a predetermined operation is performed, and stored in the disk device group 270.

In this way, in the disk array system 200, it is possible to set whether or not the writing is possible on a logical data block unit basis, for the LA 402 to be appended to the logical data block 401 by using the set write inhibition bit 404.

As descrived above, according to the first embodiment of this invention, for the data sent from the host side, the write inhibition bit 404 at the sector unit of the data is set to thereby set whether or not the writing is possible. By setting the write inhibition bit 404 to "1" at the time of the first writing to the sector, whether or not the writing at the sector unit of the disk device group 270 is possible can be set. Thus, since the writing to the sector on and after the second trial is not received, even if the disk device group 270 constitutes the RAID, the WORM function can be attained.

Next, a second embodiment of this invention will be described below.

In the second embodiment, a bitmap for storing the write inhibition bit is provided to, thereby increase the input/output speed of the data. It should be noted that the system configuration of the second embodiment is common to that of the first embodiment shown in FIG. 1. Thus, explanation thereof is omitted.

In the disk array system 200 of the second embodiment, a region (bitmap) for storing the write inhibition bit for each sector is set in the disk cache 230. An address of the bitmap is associated with an address of the corresponding sector in a one-to-one relationship. The disk array system 200, when receiving the write command from the host A 100, does not refer to the write inhibition bit 404 with regard to all the sectors of the disk device group 270 or the disk cache 230, but refers to the write inhibition bits stored in the bitmap, to thereby check whether or not the writing is possible.

Figure 4:
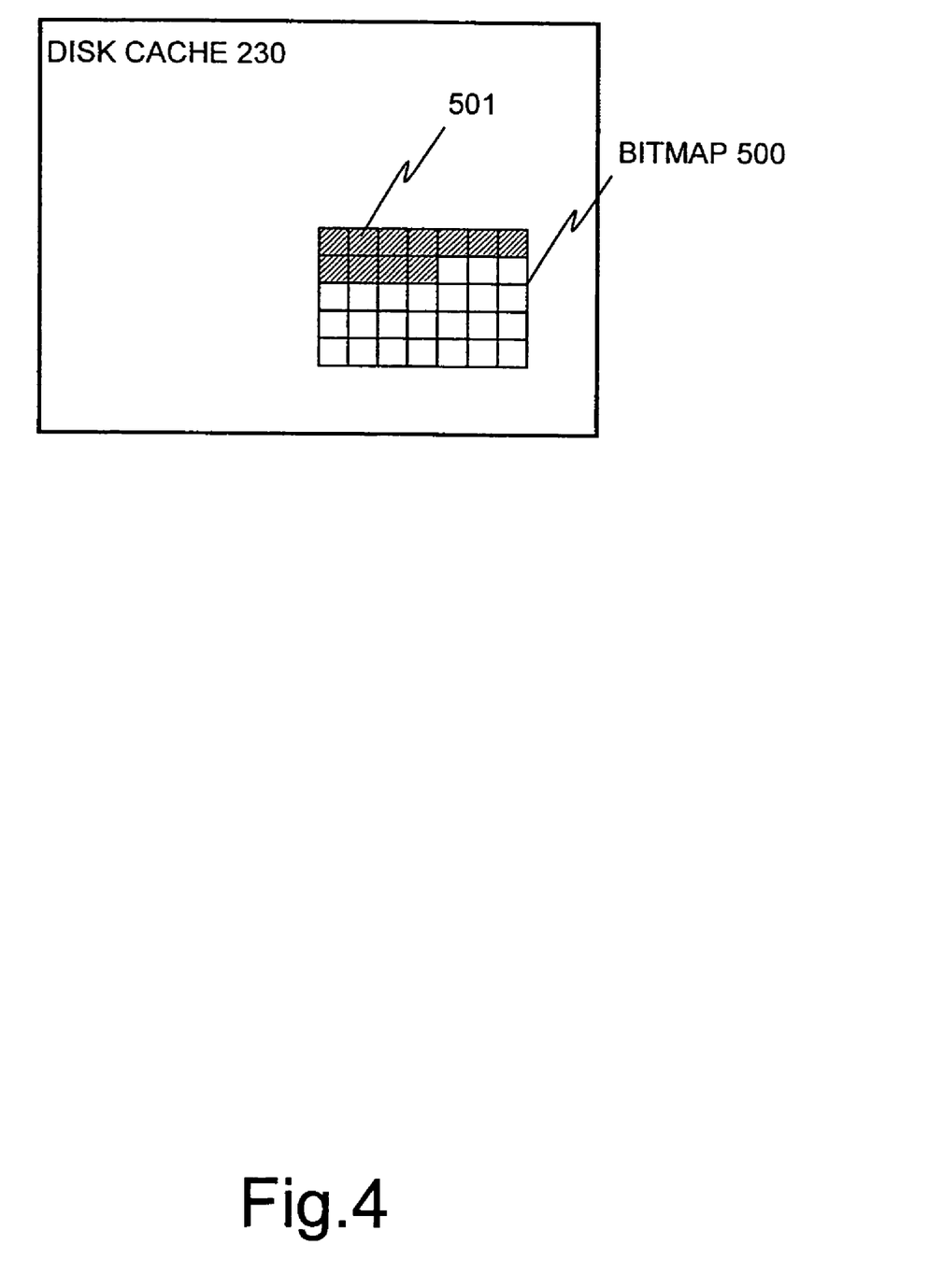
FIG. 4 is a view explaining a bitmap according to a second embodiment of this invention.

FIG. 4 is an explanatory diagram showing a bitmap 500, to be stored in the disk cache 230.

The bitmap 500 is stored in the predetermined region of the disk cache 230. In this bitmap 500, the write inhibition bits 404 included in the expanded data blocks 400 are stored as write inhibition bits 501 in the order starting from the head of the bitmap 500. In FIG. 4, the portion in which the write inhibition bits 501 are stored is indicated as shaded areas. The address of the sector storing the expanded data block 400 is associated with the address of the write inhibition bit 501 stored in the bitmap 500 in the one-to-one relationship. Thus, only by referring to the bitmap 500, it is possible to check the write inhibition bit 404 of the expanded data block 400 of the corresponding sector.

For example, let us suppose that the capacity of the region used in the bitmap 500 is 1 MB. Then, when the write inhibition bit 501 is expressed in 1 bit, 1 MB=1,024 KB=1,048,576 Bytes=8,388,608 bits.

Thus, as calculated as follows:

8,388,608 bits×512 Bytes=4,294,967,296 Bytes=4 GBytes

It is possible to store the write inhibition bits of the sectors having a size of 4 GBytes.

It should be noted that a plurality of write inhibition bits 404 may be associated with one write inhibition bit 501 of the bitmap 500. For example, when even one of the write inhibition bits corresponding to 10 sectors is set to the write inhibition, the bit corresponding to the 10 sectors are set to the write inhibition. Then, at the time of the data writing, unless the bit of the bitmap is not set to the write inhibition as a result of referring to the bit of the bitmap including the sector targeted for the writing, all of the sectors corresponding to the bit are judged to be writable. On the other hand, when the bit of the bitmap is set to the write inhibition, the data is read from the disk cache 230, and the write inhibition bit in the LA is judged for each logical data block. The employment of such a method enables reduction in the size of the bitmap and enables the suppression in the pressure on the capacity of the disk cache 230.

Next, the WORM function using the bitmap 500 will be described below.

Figure 5:
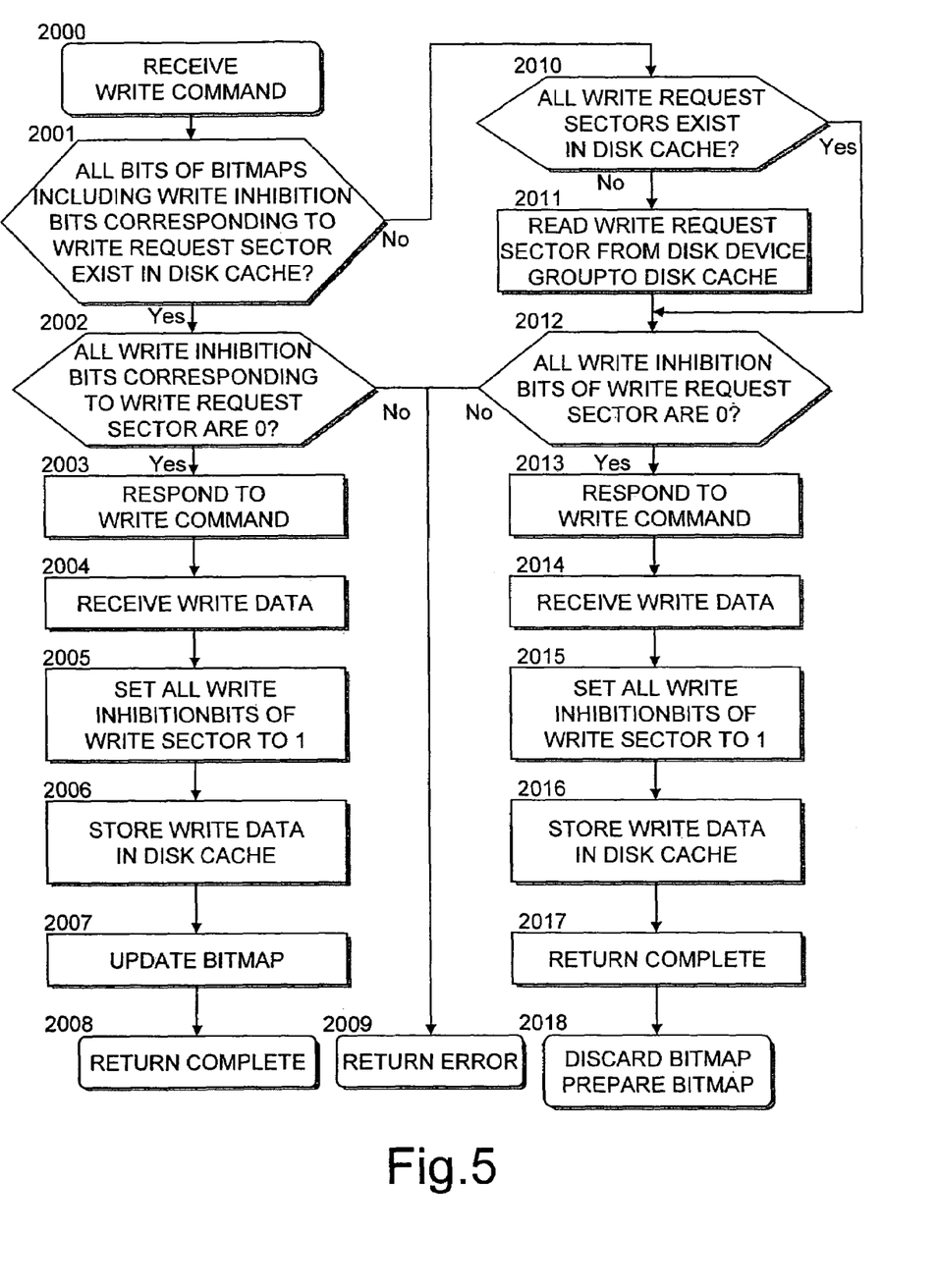
FIG. 5 is a flowchart showing a process for storing a WORM data in a disk cache according to the second embodiment of this invention.

FIG. 5 is a flowchart showing the process which is carried out by the MPU 280 when the write command is received from the host A 100 in the disk array system 200, according to the second embodiment of this invention.

The MPU 280 of the disk array system 200, when receiving the write command from the host A 100 (Step 2000), judges whether or not the bits of the bitmap 500 of the disk cache 230 corresponding to the sectors of the disk device related to the request of the write command are all stored in the disk cache 230 (Step 2001). When even a part of the bit of the bitmap 500 corresponding to the sectors related to the request is judged not to be stored, the process advances to Step 2010.

When the bits of the bitmap 500 corresponding to all of the sectors are judged to be stored in the disk cache 230, whether or not the write inhibition bits 501 of all of the sectors related to the request are at "0", namely, "Writable" is judged by referring to the bitmap 500 (Step 2002). If at least one write inhibition bit 501 of the sectors related to the request is judged to be set to "1", namely, at least one sector is judged to be set to the write inhibition, the error is returned to the host A 100 issuing the write command (Step 2009).

When the write inhibition bits 501 of all of the sectors related to the request are judged to be set to "0", namely, all of the sectors related to the request are judged to be writable, the response to the write command received in Step 2000 is transferred to the host A 100 (Step 2003).

The host A 100, when receiving this response, transferres the write data to the sector related to the request, to the disk array system 200.

The MPU 280, when receiving the write data corresponding to the write command received in Step 2000 (Step 2004), sets all the write inhibition bits 404 of the LA 402 appended to the logical data block of the write data, to "1" (Step 2005). The setting of the write inhibition bit 404 of this LA 402 is the same as in Step 1006 of FIG. 3 as mentioned above.

The write inhibition bit 404 of the LA 402 is set to "1", and the logical data block (expanded data block 400) appended with the LA 402 and the LRC 403 is stored in the disk cache 230 (Step 2006). When the expanded data block 400 is stored in the disk cache 230, the MPU 280 stores the write inhibition bit 404 of the newly stored expanded data block 400 in the region corresponding to the bitmap 500, and updates the bitmap 500 (Step 2007).

Next, the MPU 280 returns a message ("Complete") indicating the completion of the data writing, to the host A 100 (Step 2008). It should be noted that the expanded data block stored in the disk cache 230 is de-staged at any timing or when a predetermined operation is performed, and stored in the disk device group 270.

On the other hand, in Step 2001, when even a part of the bits of the bitmap 500 corresponding to the requested sectors is judged not to be stored, whether or not all of the sectors requested by the write command are stored in the disk cache 230 is judged (Step 2010).

When at least one of the requested sectors is judged to be not stored in the disk cache 230, the sector is read from the disk device group 270 to the disk cache 230 (Step 2011). On the other hand, when the requested sector is judged to be present in the disk cache 230, the process advances to Step 2012, without any execution of the process of Step 2011, Next, the write inhibition bit 404 included in the LA 402 of the sector is referred to. Then, whether or not the write inhibition bits 404 of all of the sectors related to the request are at "0", namely, "Writable" is judged (Step 2012). When at least one write inhibition bit 404 of the sectors related to the request is judged to be set to "1", namely, at least one sector is judged to be set to the write inhibition, the error is returned to the host A 100 issuing the write command (Step 2009).

It should be noted that is Step 2011, when there is a portion in which even a part of the requested sectors is stored in the disk cache 230, that refered to the bitmap 500 instead of the write inhibition bit of that portion. On the other hand, as for the portion which is not stored in the disk cache 230, it is allowable to read only that portion from the disk device group 270 to the disk cache 230 and refer to the write inhibition bit 404 included in the sector read to the disk cache 230. In this way, by reading only the sector which is not stored in the disk cache and referring to the write inhibition bit 404 of the sector, it is possible to reduce the access to the disk device group 270, and improve the efficiency of the process.

Next, when the write inhibition bits 404 of all of the requested sectors are judged to be set to "0", namely, all of the requested sectors are judged to be writable, the response to the write command received in Step 2000 is transferred to the host A 100 (Step 2013).

The host A 100, when receiving this response, transferrs to the disk array system 200 the write data to be written to the requested sector.

The MPU 280, when receiving the write data corresponding to the write command received in Step 2000 (Step 2014), sets all of the write inhibition bits 404 of the LA 402 to be appended to the logical data block of the write data, to "1" (Step 2015). The setting of the write inhibition bit 404 of this LA 402 is the same as in Step 1006 of FIG. 3 as mentioned above.

The write inhibition bit 404 of the LA 402 is set to "1", and the logical data block (expanded data block 400) appended with the LA 402 and the LRC 403 is stored in the disk cache 230 (Step 2016). When the expanded data block 400 is stored in the disk cache 230, the MPU 280 returns the message ("Complete") indicating the completion of the data writing, to the host A 100 (Step 2017).

Next, the bitmap 500 already stored in the disk cache 230 is discarded. Then, the write inhibition bits 404 of the newly written expanded data block 400 are stored in the region corresponding to the bitmap 500. At this time, the write inhibition bits 404 of the newly written expanded data block 400 are prepared as the bitmap 500 which is set so as to be the region of 10% from the read of the region of the bitmap 500 (Step 2018).

It should be noted that the expanded data block stored in the disk cache 230 in Steps 2006 and 2016 are de-staged at any timing or when a predetermined operation is performed, and stored in the disk device group 270.

In this way, in the disk array system 200, whether or not the writing at the logical data block unit can be judged, by using the write inhibition bit 501 set in the bitmap 500 stored in the disk cache 230.

When the second embodiment described above is applied to a write-once type file system, the probability that the bit of the bitmap 500 corresponding to the write request sector is present in the disk cache 230 in Step 2001 becomes higher, which is preferable. Moreover, using a bitmap restructuring process (FIG. 6(a) and 6(b)) can increase the probability that the bit of the corresponding bitmap 500 is present in the disk cache 230 in Step 2001, which improves the efficiency.

In the write-once type file system, the bitmap 500 referred to when the write command is received is located near the sector on which the overwrite is performed immediately before. Thus, this embodiment carries out the bitmap restructuring process.

Figure 6A:
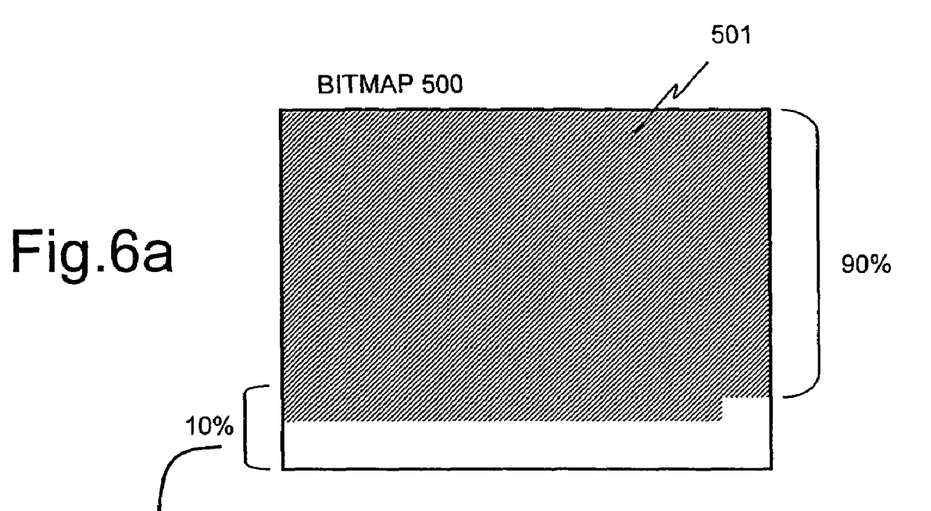
FIGS. 6(a) and 6(b) are explanatory diagrams of a bitmap restructuring process according to the second embodiment of this invention.
Figure 6B:
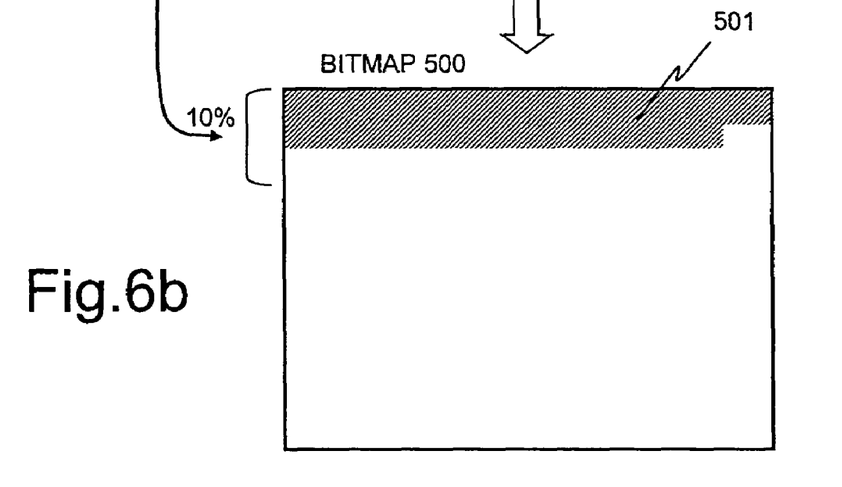

FIGS. 6(a) and 6(b) are explanatory diagrams showing the bitmap restructuring process.

The increase in the files to be overwritten results in the increase in the write inhibition bits 501 stored in the bitmap (the used write inhibition bits 501). Then, when the used write inhibition bits 501 are stored in excess of 90% of the total capacity of the bitmap 500 (refer to FIG. 6(a)), only 10% from the end of the bitmap 500 is left, and the write inhibition bits 501 before the end are deleted from the bitmap 500. The portion of the left 10% is shifted to the head of the bitmap 500 (refer to FIG. 6(b)). The new portion of the latter 90% is prepared by reading the corresponding write inhibition bit 404 from the disk device group 270.

This bitmap restructuring process may be carried out as a background process at any timing, in the disk array system 200. When it is detected in the background process that the write inhibition bits 501 of the bitmap 500 are stored in excess of 90%, the bitmap restructuring process is performed.

In this way, in the disk array system according to the second embodiment of this invention, in addition to the effects of the first embodiment, since the write inhibition bits 404 of the respective logical data blocks 401 are stored as a bitmap format in the disk cache 230, the process for checking the write inhibition bit within the disk device group 270 for each sector can be omitted, thereby making the access to the WORM file faster. In particular, in the write-once type file system, the execution of the bitmap restructuring process enables the access to the WORM file to be further faster.

The change in the setting with regard to the WORM function, such as the use/nonuse of the WORM function in this invention, the WORM setting to each volume, the capacity of the bitmap 500, the bitmap restructuring process timing, and the like, may be treated as the fixed process within the disk array system 200. However, the setting may be changed in accordance with the instruction from a disk array management program to be executed on the host or on a management terminal.

While the present invention has been described in detail and pictorially in the accompanying drawings, the present invention is not limited to such detail but covers various obvious modifications and equivalent arrangements, which fall within the purview of the appended claims.

What is claimed is:

1. A disk array system which stores data accessed by a computer, the disk array system comprising:
   a plurality of disk drives each of which stores data;
   a cache memory that temporarily stores data, which is transferred between the computer and the plurality of disk drives; and
   a control unit that controls write operation according to a write command received from the computer,
   wherein the control unit is configured to divide write data received from the computer according to the write command into a plurality of blocks, add write inhibition information to each of the plurality of blocks, store the plurality of blocks each including the write inhibition information in the cache memory, and control to write each of the plurality of blocks including the write inhibition information from the cache memory to a sector in one of the plurality of disk drives,
   wherein when the write command is received from the computer, the control unit is configured to check whether there is at least one sector storing a block including the write inhibition information among a plurality of sectors requested in the received write command, and
   wherein if there is no sector storing a block including the write inhibition information among the plurality of sectors, the control unit is configured to transmit a response to the write command to the computer and receive the write data according to the write command.

2. A disk array system according to claim 1, wherein when a plurality of blocks, into which the received write data is divided, are stored in the cache memory, the control unit is configured to transmit a completion report of the write command to the computer.

3. The disk array system according to claim 2, wherein after the transmission of the completion report of the write command, the control unit is configured to store each of the plurality of blocks from the cache memory to a sector in one of the plurality of disk drives.

4. The disk array system according to claim 1, wherein if there is at least one sector storing a block including the write inhibition information among the plurality of sectors requested in the received write command, the control unit is configured to transmit an error report to the computer.

5. The disk array system according to claim 4, wherein when at least one of the sectors requested in the received write command is judged not to be stored in the cache memory, the control unit reads the sectors requested in the received write command from the plurality of disk drives to the cache memory, and the control unit checks the write inhibition information of the blocks stored in the cache memory to determine whether all the sectors are set to be writable.

6. The disk array system according to claim 4, wherein the control unit provides each block with a guarantee code having a predetermined size length and having an error detection code and a logical address of the block, and stores each block in the cache memory, and wherein the write inhibition information is structured by bits within the guarantee code.

7. A disk array system which stores data accessed by the computer, the disk array system comprising:
   a plurality of disk drives that store the data;
   a cache memory that temporarily stores the data which is transferred between the computer and the plurality of disk drives; and
   a control unit that controls an input/output of the data to/from the cache memory;
   wherein, when receiving a data write request from the computer, the control unit:
      refers to write inhibition information indicating whether a writing to a region divided into access unit lengths of the disk drive designated by the write request is possible, from the cache memory; and
      judges whether the writing of write data from the computer is possible, by using the write inhibition information; and
   wherein the control unit:
      divides the write data transferred from the computer into the predetermined data lengths; and
      stores the write inhibition information in a bitmap corresponding to each piece of data divided into the predetermined data lengths and stored in the cache memory.

8. The disk array system according to claim 7, wherein the control unit:
   judges whether the bitmap corresponding to the region of the disk drive designated by the write request is stored in the cache memory;
   if the bitmap is not stored in cache memory, refers to the write inhibition information of the region of the disk drive designated by the write request, from the cache memory;
   if the write inhibition information indicates that the writing is possible,
   receives the write data from the computer,
   sets the write inhibition information indicating that the writing to the bitmap corresponding to the region of the disk drive designated by the write request is possible,
   stores the write data from the computer, in the cache memory; and
   if the write inhibition information indicates that the writing is impossible, informs to the computer that the writing is impossible.

9. A disk array system which stores data accessed by the computer, the disk array system comprising:
   a plurality of disk drives that store the data;
   a cache memory that temporarily stores the data which is transferred between the computer and the plurality of disk drives; and
   a control unit that controls an input/output of the data to/from the cache memory;
   wherein, when receiving a data write request from the computer, the control unit:
      refers to write inhibition information indicating whether a writing to a region divided into access unit lengths of the disk drive designated by the write request is possible, from the cache memory; and
      judges whether the writing of write data from the computer is possible, by using the write inhibition information; and
   wherein the control unit:
      divides the write data transferred from the computer into the predetermined data lengths;
      stores the write inhibition information in a bitmap corresponding to each piece of data divided into the predetermined data lengths and stored in the cache memory;

compares a ratio of used write inhibition information and unused write inhibition information of the bitmap with a predetermined value; and if the ratio of the used write inhibition information and the unused write inhibition information is equal to or greater than the predetermined value, restructures a region in which the used write inhibition information is included to increase the ratio of the unused write inhibition information and the used write inhibition information.

* * * * *